Patented Jan. 9, 1923.

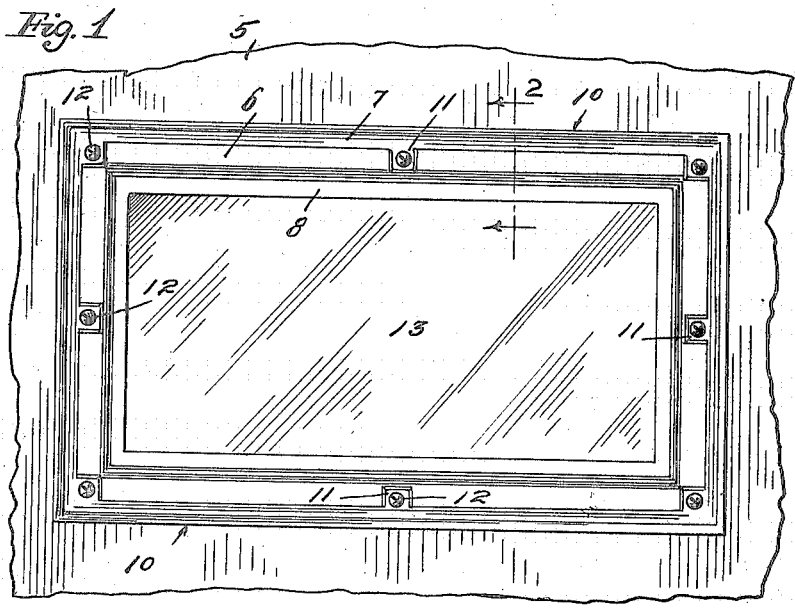
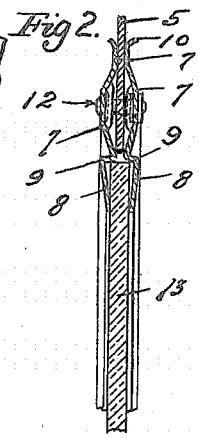
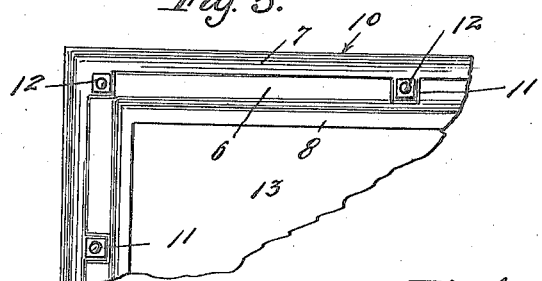
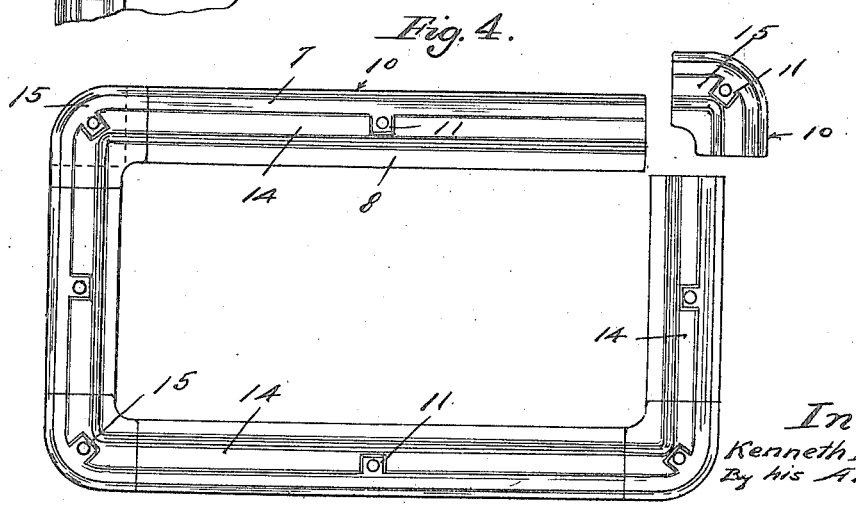

1,441,777

UNITED STATES PATENT OFFICE.

KENNETH E. BEMIS, OF MINNEAPOLIS, MINNESOTA.

AUTOMOBILE CURTAIN WINDOW FRAME.

Application filed March 19, 1921. Serial No. 453,743.

*To all whom it may concern:*

Be it known that I, KENNETH E. BEMIS, a citizen of the United States, residing at Minneapolis, in the county of Hennepin and State of Minnesota, have invented certain new and useful Improvements in Automobile Curtain Window Frames; and I do hereby declare the following to be a full, clear, and exact description of the invention, such as will enable others skilled in the art to which it appertains to make and use the same.

My present invention relates to automobile curtain window frames and has for its object to improve the same in the several particulars hereinafter noted.

To the above end, the invention consists of the novel devices and combinations of devices hereinafter described and defined in the claim.

In the accompanying drawings, which illustrate the invention, like characters indicate like parts throughout the several views.

Referring to the drawings:

Fig. 1 is an outside elevation of the invention applied to an automobile curtain;

Fig. 2 is a detail view in transverse section taken on the line 2—2 of Fig. 1;

Fig. 3 is a fragmentary inside elevation of the invention as shown in Fig. 1; and Fig. 4 is an elevation showing a modified form of the automobile curtain window frame.

Referring first to the invention as shown in Figs. 1 to 3, inclusive, the numeral 5 indicates an automobile curtain having an opening in which is fitted one form of my improved automobile curtain window frame and which frame is attached to said curtain. This window frame includes duplicate inner and outer sections 6, each of which is stamped and pressed from a single sheet of metal. The outer longitudinal portions of the frame sections 6 are bent to afford curtain-clamping flanges 7 and the inner longitudinal portions thereof are bent to afford glass-clamping flanges 8. Said frame sections 6 are further longitudinally bent, at the junction of the glass-clamping flanges 8 therewith, to afford glass-retaining shoulders 9. The outer longitudinal edges of the curtain-clamping flanges 7 are rolled or turned away from each other, as at 10, to prevent said edges from cutting or wearing the curtain.

Formed in the two frame sections 6, between the flanges 7 and 8, are seats or depressions 11, in which are holes to receive nut-equipped bolts 12 for connecting said sections and clamping the flanges 7 onto the curtain 5 and the flanges 8 onto a pane of glass 13 inserted therebetween. The shoulders 9 hold the pane of glass 13 against edgewise movement in all directions. Primarily, the glass-clamping flanges 8 are in converging relation and, when clamped onto the pane of glass 13, are sprung apart, thereby tightly engaging said pane of glass to afford a tight joint therebetween and securely hold the pane of glass so that it will not break or rattle. It will be noted that the transverse width of the clamping flanges are relatively wide and, hence, will not cut or tear the curtain 5.

Referring now to the construction shown in Fig. 4, the frame of the window is of the same general shape as the one just described, with the exception that, in place of making each frame section from a single sheet of metal, the top, bottom and ends thereof are made separately in straight strips 14 and which strips are connected by corner elbows 15 soldered or otherwise rigidly secured thereto. These strips 14 may be made from the waste material blanked from the centers of the frame sections constructed as shown in Figs. 1, 2 and 3.

The sectional or multi-part frame structure is not herein claimed, but is disclosed and claimed in my pending application Serial No. 563,856, filed of date May 26, 1922, and entitled "Curtain window frame."

The frame made up of corner elbows and side and end strips is not herein claimed but is disclosed and claimed in my co-pending application S. N. 563,856, filed May 26, 1922.

What I claim is:

An automobile curtain window frame comprising two sections having curtain clamping flanges and glass-clamping flanges, means connecting said sections to clamp their respective flanges onto a curtain and a pane of glass, the outer edges of the curtain-clamping flanges being turned away from each other, said glass-clamping flanges primarily being in converging relation.

In testimony whereof I affix my signature.

KENNETH E. BEMIS.